Patented June 30, 1925.

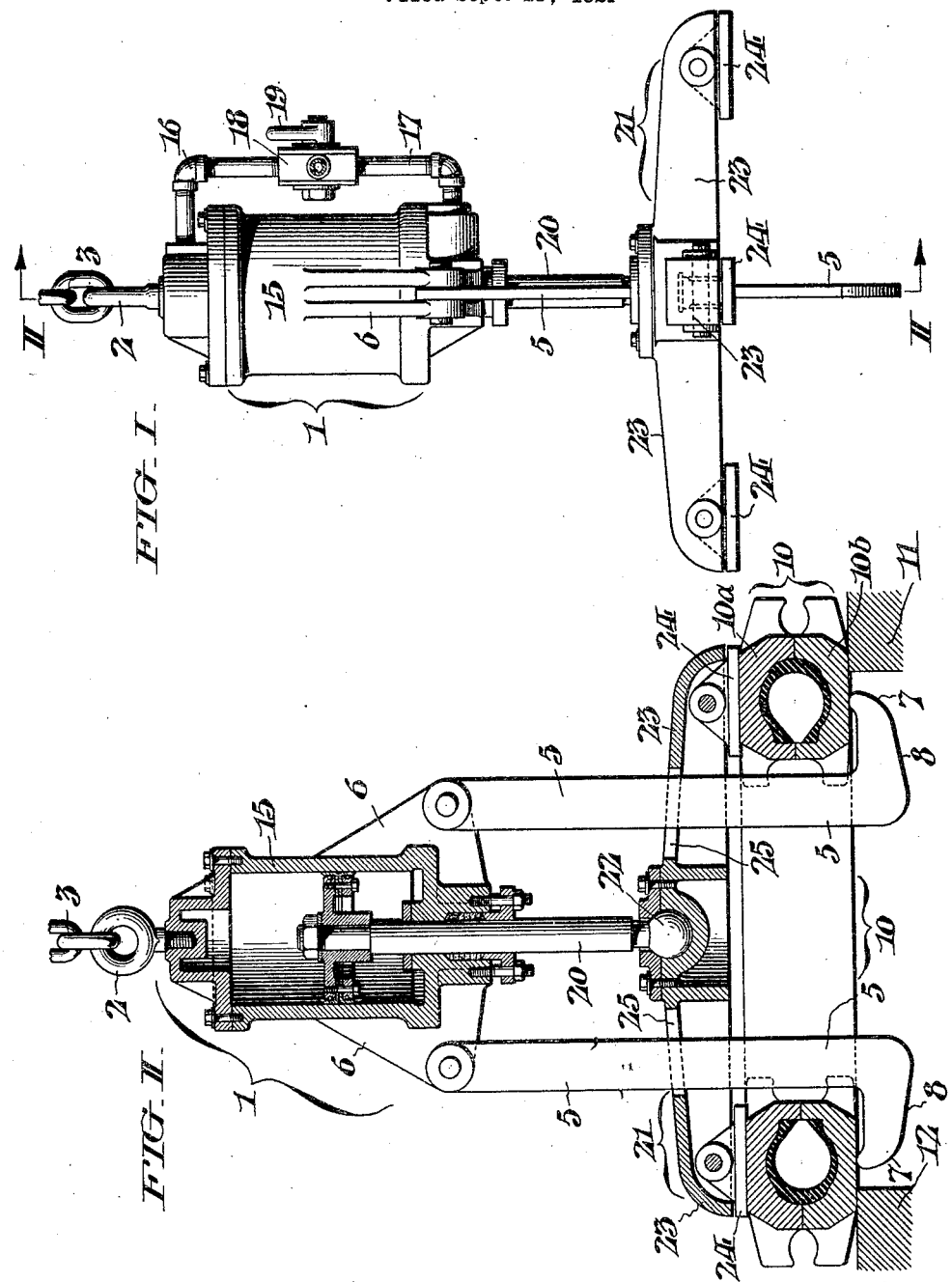

1,544,011

UNITED STATES PATENT OFFICE.

JOHN KEARNS, OF CONSHOHOCKEN, AND WILLIAM Y. DUNCAN, JR., OF BARREN HILL, PENNSYLVANIA.

TIRE-MOLD-HANDLING DEVICE.

Application filed September 23, 1921. Serial No. 502,648.

*To all whom it may concern:*

Be it known that we, JOHN KEARNS and WILLIAM Y. DUNCAN, Jr., citizens of the United States, residing at Conshohocken and Barren Hill, county of Montgomery, and State of Pennsylvania, have invented certain new and useful Improvements in Tire-Mold-Handling Devices, of which the following is a specification, reference being had to the accompanying drawings.

Our invention relates to devices useful in handling molds such as employed in the manufacture of automobile tires and the like.

As is well known to those skilled in the art of tire manufacture, the molds used in curing or vulcanizing are ordinarily made of metal, and must necessarily be of sturdy construction in order to be capable of withstanding the comparatively high temperatures and pressures incidental to the curing process. Accordingly such molds are very bulky and heavy and therefore extremely cumbersome to handle both in effecting closure after being charged with the tires, and transfer to and from the vulcanizing oven or apparatus.

The paramount object of our invention is to minimize as much as possible, the labor necessary in handling tire molds so that the operations of opening and closing the molds and transferring them from place to place in the tire factory, may be accomplished more expeditiously and economically than heretofore.

Other objects and attendant advantages of our invention will become readliy apparent from the detailed description which follows:

In the drawings, Fig. I is an elevation of a tire mold handling device conveniently embodying our invention; and Fig. II is a vertical section of the same viewed in the direction of the arrows II—II in Fig. I.

As herein illustrated, the device comprises a head comprehensively indicated at 1, said head having an eye 2 by which it may be appended to the end of a chain 3 for suspension from an overhead crane carriage, not shown. Disposed about the head 1 as a center, is a group of hooks 5, 5, in the present instance two in number, these being pivotally hung from the ends of brackets 6, 6, projecting outwardly from said head. The ends of the hooks proper are rounded as shown at 7—7 and these rounded portions merge into, and form a part of inclined cam edges 8—8. When the hooks 5, 5 are introduced within the opening of an annular mold such as shown at 10 in Fig. II, the cam inclines 8 engage the inner periphery of said mold and cause the hooks to be swung radially inward or collapsed. Subsequent to being fully projected, the hooks 5,5 are released from engagement with the inside of the mold 10, and under the influence of gravity swing automatically beneath the mold as clearly suggested in Fig. II; and when the slack on the chain 3 is taken up, it will be seen that the mold is sustained in suspension solely under the support of said hooks. While being picked up in the manner just described the tire molds are supported upon an appropriate table 11 with a center opening 12 which will allow free movement of the hooks 5, see Fig. II.

In order to hold the two parts or halves 10$^a$ and 10$^b$ of the mold 10 tightly closed during the application of the locking appurtenances (not shown) ordinarily employed in connection with such molds, we have provided pressure applying means which include a pressure fluid cylinder 15 shown as being integrally formed with the head 1 and as having its axis disposed centrally of the hooks 5—5. From Fig. I it will be noted that the cylinder 15 is of the double acting type, with the ports in its opposite ends connected by pipes 16—17 with a control valve 18 capable of being actuated by a hand lever 19. To the lower end of the piston rod 20 of the cylinder 15 is attached, with capacity for free universal motion, a pressure distributing means in the form of a spider 21. Attachment of the spider 21 is preferably effected by means of a ball and socket joint whose construction is clearly shown at 22 in Fig. I. The radial arms 23 of the spider 21 are of channelled cross section and receive, within their outer ends, the upstanding ears of pressure shoes 24—24 which are pivotally attached so as to be self adjusting in accommodating themselves to any inaccuracies in the top surface of the mold member 10$^a$. By this arrangement it will be seen that the applied pressure is uniformly distributed through the shoes 24, 24 and applied at intervals about the tire mold 10, thus insuring tight closure of the mold parts to the avoidance of the possibility of accidental disalignment during assembling. Also, the arms 23 of the spider 21 are slotted as at 25, 25 to accommodate the hooks 5, 5 and to confine the motion of the latter to radial directions, while at the same time, said spider is held against undue turning relative to the head 1.

When the mold 10 has been assembled and locked in the manner suggested, it is ready to be transferred to the oven or apparatus wherein vulcanizing or curing is to be effected. After being deposited within such oven or apparatus, pressure is released from above the piston in cylinder 15 by proper actuation of the valve 19, and then admitted beneath said piston with the result that the spider 21 is raised sufficiently to allow the hooks to be readily collapsed by hand preparatory to withdrawal from within the mold.

Thus by means of our invention, tire molds may be not only quickly closed, but with like facility transferred to the vulcanizing or curing oven or apparatus without requiring undue physical exertion on the part of the operative. Upon completion of the vulcanizing or curing process, the tire molds may be withdrawn from the oven or apparatus in a manner similar to that already explained.

Having thus described our invention, we claim:

1. A device of the character described, including supporting means capable of automatically collapsing in being introduced from above through the opening of an annular mold, and subsequently, of expanding automatically to engage the mold from beneath, comprising a group of freely suspended hooks formed with cam edges for engaging the inner periphery of the mold so as to be swung inwardly in effecting automatic collapse of the supporting means as aforesaid; in combination with means operative in opposition to said hooks for applying a downward pressure to hold the parts of the mold tightly closed together.

2. A device of the character described, including a collapsible supporting means comprising a series of hooks grouped about a common center, said hooks being pivotally hung so as to be capable of yielding to swing radially inward when introduced from above through the opening of an annular mold, and subsequently, of automatically swinging outward to engage the mold from beneath; in combination with a radially armed pressure distributing spider downwardly effective in opposition to said hooks for clamping the parts of the annular mold tightly together.

3. A device of the character described, including means for holding the parts of a tire mold tightly closed comprising a series of pivotally hung hook members to support the mold, a series of self adjusting pressure shoes for engaging on top of the mold at intervals about the same; and means for distributing pressure uniformly between said shoes.

4. A device of the character described, including means for holding the parts of a tire mold tightly closed comprising a series of pivotally hung hook members to support the mold, a series of self adjusting pressure shoes for engaging on top of the mold at intervals about the same; and a pressure distributing spider having radial arms to the ends of which said pressure shoes are pivotally attached.

5. A device of the character described, including a group of hooks capable of being introduced through the opening of a tire mold to automatically engage the same from beneath; a suspension head from which said hooks are pivotally hung; in combination with means operative in opposition to said hooks in applying pressure to hold the parts of the mold tightly closed comprising a pressure cylinder disposed centrally of the hooks and forming part of said suspension head; a radially armed pressure distributing spider attached, with capacity for universal motion, to the piston rod of said cylinder; and a series of self adjusting pressure shoes attached to the arms of said spider for applying pressure at intervals about the tire mold.

6. A grappling device for annular tire molds, including freely suspended hooks capable of circumscription to enter the mold opening from above and expansible by gravity to engage and support the mold from beneath for transportation, and a radially armed pressure distributing device downwardly effective in opposition to said hooks for clamping the parts of the mold tightly together.

7. A grappling device for annular tire molds, including a series of pivotally hung hook members to support the mold from beneath in a substantially horizontal plane for transportation, a clamping element embodying a series of self adjusting shoes resting upon the mold, means to apply pressure to said element, and a universal connection between the element and pressure means.

8. Supporting means for tire molds with capacity for gravitational collapse to enter the inner periphery of said mold when lowered into operative position, in combination with means downwardly operative in opposition thereto for applying pressure to clamp the parts of the mold tightly together.

9. A suspensible head having radially directed pivotally hung hook members actuated by gravity to move into position to support a tire mold from the underside for transportation, in combination with a radially armed spider downwardly effective in opposition to said hooks for clamping the parts of the tire mold together.

10. A suspensible head having pivotally hung hook members actuated by gravity to enter the inner periphery of a mold when lowered thereinto and automatically gravitate into position to support said mold from the underside for transportation, in combination with an armed pressure distributing spider operative in opposition to said hooks for clamping the parts of the mold tightly together.

11. A device for handling an annular tire mold including pendent and inwardly collapsible members for gravitation through and into supporting impingement below said mold, in combination with means operative in opposition to said members for applying a downward pressure to hold the parts of the mold tightly closed together.

12. A device for handling an annular tire mold including pendent hooks capable of inward collapsing when introduced from above, and gravitation into expanded supporting engagement under the mold for the purpose of transportation, in combination with a radially armed pressure distributing spider downwardly effective in opposition to said hooks for clamping the parts of the annular mold tightly together.

In testimony whereof, we have hereunto signed our names at Conshohocken, Pennsylvania, this 15th day of September 1921.

JOHN KEARNS.
WILLIAM Y. DUNCAN, Jr.

Witnesses:
 ETHEL S. BALMER,
 L. FRAN MARKEL.